US008615231B2

(12) United States Patent
Demarez et al.

(10) Patent No.: US 8,615,231 B2
(45) Date of Patent: Dec. 24, 2013

(54) METHOD FOR TRANSFERRING INFORMATION BETWEEN NETWORKS OF DIFFERENT TECHNOLOGY TYPES

(75) Inventors: Christophe Demarez, Igny (FR); Philippe Godin, Viroflay (FR)

(73) Assignee: Alcatel Lucent, Paris (FR)

( * ) Notice: Subject to any disclaimer, the term of this patent is extended or adjusted under 35 U.S.C. 154(b) by 305 days.

(21) Appl. No.: 13/001,839

(22) PCT Filed: Jun. 30, 2009

(86) PCT No.: PCT/EP2009/004694
§ 371 (c)(1),
(2), (4) Date: Mar. 21, 2011

(87) PCT Pub. No.: WO2010/006693
PCT Pub. Date: Jan. 21, 2010

(65) Prior Publication Data
US 2011/0165902 A1 Jul. 7, 2011

(30) Foreign Application Priority Data

Jun. 30, 2008 (EP) .................................... 08290646

(51) Int. Cl.
*H04W 76/02* (2009.01)
*H04W 8/10* (2009.01)
(52) U.S. Cl.
USPC ...................... 455/432.2; 455/435.1; 455/436
(58) Field of Classification Search
None
See application file for complete search history.

(56) References Cited

PUBLICATIONS

3GPP TS 23.401 V8.2.0 (Jun. 2008) 3rd Generation Partnership Project; Technical Specification Group Services and System Aspects; General Packet Radio Service (GPRS) enhancements for Evolved Universal Terrestrial Radio Access Network (E-UTRAN) access (Rel8) (URL http://www.3gpp.org/ftp/Specs/archive/23_series/23/401/23401 -820.zip retreived Mar. 20, 2013.*
$3^{rd}$ Generation Partnership Project: "3GPP TS 23.401 V8.2.0 (Jun. 2008); $3^{rd}$ Generation Partnership Project: Technical Specification Group Services and System Aspects; General Packet Radio Service (GPRS) enhancements for Evolved Universal Terrestrial Radio Access Network (E-UTRAN) access (Release 8)," XP002508813, pp. 1-182, Jun. 9, 2008.
International Search Report for PCT/EP2009/004694 dated Dec. 9, 2009.
$3^{rd}$ Generation Partnership Project: 3GPP TS 36.413 V8.2.0 (Jun. 2008); $3^{rd}$ Generation Partnership Project; Technical Specification Group Radio Access Network; Evolved Universal Terrestrial Radio Access Network (E-UTRAN); S1 Application Protocol (S1AP) (Release 8), XP002508814, pp. 1-179, Jun. 10, 2008.

* cited by examiner

*Primary Examiner* — Philip Sobutka
(74) *Attorney, Agent, or Firm* — Fay Sharpe, LLP

(57) ABSTRACT

In a method for transferring information between wireless networks of different technology types, a node in the first network receives configuration information associated with a plurality of nodes of the second network, the information including identifying information for radio access controllers associated with neighboring cells of the second technology type. After it has received the configuration information, the node in the first network sends the identifying information to a plurality of access nodes in the first network via which mobile devices access the first network. The invention is particularly, but not exclusively, applicable where the first network is in accordance with LTE and the second one with UMTS, and the information includes RNC-ids for use in handover from the LTE to the UMTS network.

10 Claims, 2 Drawing Sheets

//!\\
METHOD FOR TRANSFERRING INFORMATION BETWEEN NETWORKS OF DIFFERENT TECHNOLOGY TYPES

FIELD OF THE INVENTION

The present invention relates to a method for transferring information between wireless networks of different technology types, where a first network of a first technology type and a second network of a second different technology type have neighboring cells.

BACKGROUND

Currently, the 3rd Generation Partnership Project (3GPP) is developing Long Term Evolution (LTE), also referred to as E-UTRAN, as set out in the technical specification 3GPP TS 36.300 v 8.5.0 (2008-05), to which the reader is referred for additional information, and related documents. 3GPP LTE aims to enhance the Universal Mobile Telecommunications System (UMTS) Radio Access Network standard, for example, by improving efficiency and services.

In LTE, user equipment (UE) communicates with a network node, E-UTRAN NodeB (eNB), with data being sent on radio bearers (RBs) over a radio link between them. The eNB interfaces with a Mobile Management Entity (MME) via an interface designated as S1. An LTE network typically includes a plurality of eNBs and MMEs as illustrated schematically in FIG. 1 (S1-flex mechanisms allow an eNB to be connected to a plurality of MMEs).

In a typical UMTS network, a plurality of Radio Access Controllers (RNCs) each control a plurality of base stations B as illustrated schematically in FIG. 2. Mobile devices UE connect to the network via the base stations.

Where a mobile device (UE) is connected to an LTE network, it may be necessary to handover its connection to another network, for example, if signal conditions change or if the mobile device is moving, or for some other purpose. Thus, a UE might be transferred from a cell in an LTE network to a UMTS network having a neighbouring cell or cells.

As part of the LTE-UMTS automatic neighbour relation function (ANRF), the eNB to which the UE is attached may be informed by the UE that it has detected a new neighbour UMTS cell. The source eNB may request the UE to obtain, from the information broadcast by the UMTS RNC to which that cell belongs, the global cell id of that neighbour cell, which uniquely identifies that cell within the UMTS network (see 3GPP TS 36.300 v 8.5.0 section 22.3.4), and might also request the Location Area Identification (LAI) and the Routing Area Code (RAC) broadcast in the neighbour cell. The global cell id is also referred to as the UC-id or UTRAN global cell id. The UTRAN cell id UC-id includes the RNC identifier (RNC-id) and the cell (C-id), where UC-id=RNC-id+C-id (see 3GPP TS 25.401 v 8.0.0 section 6.1.5).

The UE is not always able to read the RNC-id (RNC identifier) of the RNC to which that cell belongs. There may be circumstances where the RNC-id cannot be obtained by applying a mask to the global UTRAN cell id/UC-id. Although the UC-id includes the RNC-id and the cell C-id (UC-id=RNC-id+C-id), the length of this can vary. In most networks UC-id (28 bits)=RNC-id (12 bits)=+C-id (16 bits). However, typically for flat areas there may also be UC-id (28 bits)=RNC-id (16 bits)+C-id (12 bits). Thus it may not be possible to detect the RNC-id using masking. As the RNC-id length of the discovered neighbouring cell is unknown, handover towards this cell from the LTE source eNB cannot be carried out because RNC-id is required for the routing of the handover message to instigate handover. In 3GPP TS 36.413 (S1-AP specification) the target cell ID for LTE-to-UMTS handover is included in the "HO Required" message sent by the source eNB and defined in section 9.2.1.6 as the target RNC-id.

As an alternative to ANRF, eNBs of an LTE network may be configured by Operation and Maintenance (O&M), when the LTE network is initially set up, to include information about the surrounding UMTS RACs where applicable, and to include a list of the RNC-ids that comprise these RACs. This requires significant effort in respect of a large number of eNBs to obtain comprehensive information about the configuration. If a change in the UMTS network occurs, for example, if a new base station is added or RAC allocation is changed, the neighbouring nodes of the LTE network need to be updated in the field.

BRIEF SUMMARY

According to one aspect of the invention, a method for transferring information between wireless networks of different technology types, where a first network of a first technology type and a second network of a second different technology type have neighboring cells, includes the steps of:

a node in the first network receiving configuration information associated with a plurality of nodes of the second network, the information including identifying information for radio access controllers associated with neighboring cells of the second technology type; and, after it has received the configuration information, the node in the first network sending the identifying information to a plurality of access nodes in the first network via which mobile devices access the first network.

The invention is particularly, but not exclusively, applicable where the first network is in accordance with LTE standards and the second one with UMTS, and the information includes RNC-ids for use in handover from the LTE to the UMTS network. There may be other combinations of different Radio Access Technology (RAT) types which could also make use of a method in accordance with the invention.

BRIEF DESCRIPTION OF THE DRAWINGS

Some embodiments and methods in accordance with the present invention will now be described, by way of example only, and with reference to the accompanying drawings, in which.

DETAILED DESCRIPTION

Figure 1:
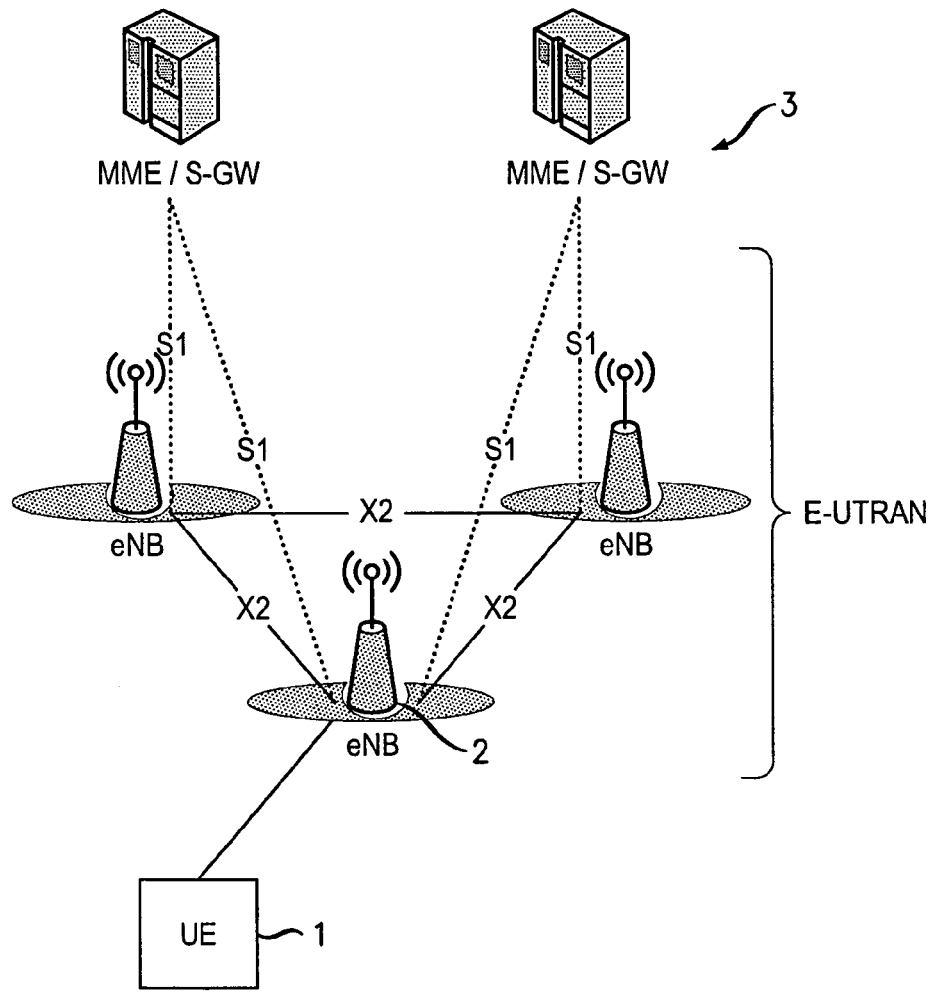
FIG. 1 schematically illustrates an LTE network.
Figure 2:
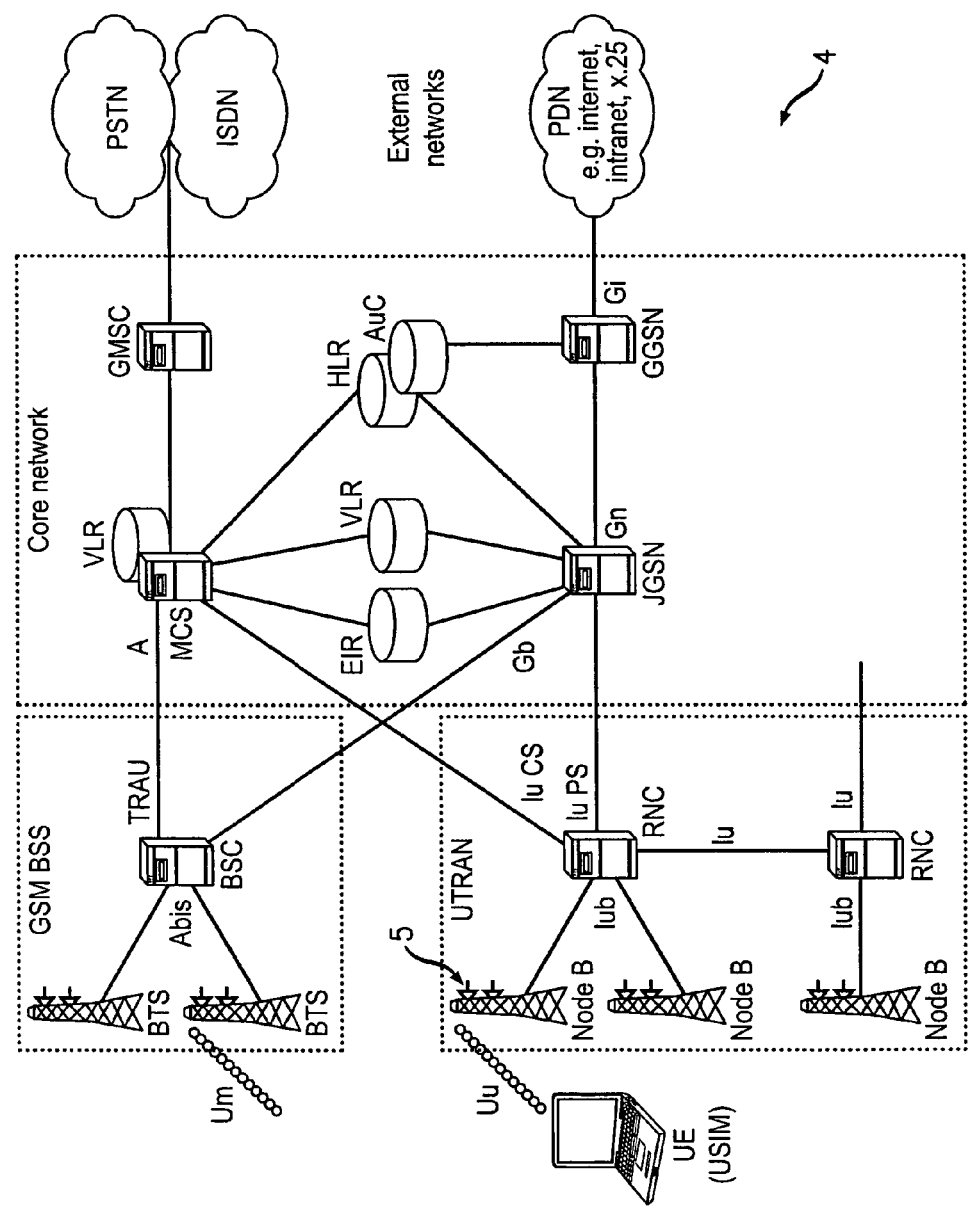
FIG. 2 schematically illustrates a UMTS network.

With reference to FIGS. 1 and 2, the required UMTS configuration information is retrieved from the UMTS Serving GPRS Support Node (SGSN) when it is required to update UMTS neighbouring cell information in an LTE network, for example: at pre-determined intervals; when a network is newly set up; when handover is contemplated; when the UMTS network 2 has been re-configured or otherwise changed; or on some other basis. This information includes a list of RACs and, for each RAC, the list of RNC-ids involved in that RAC. This information is typically readily available in the SGSN because it is used for paging. The information is transmitted to an MME of the LTE network, which then in turn delivers this information to all the eNBs of the network. In case of S1-flex, only one MME may send the information to multiple eNBs.

Figure 3:
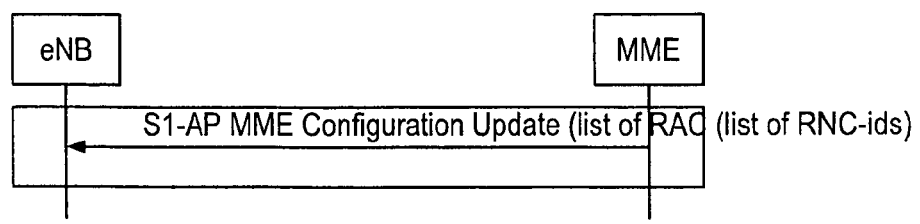
FIG. 3 schematically illustrates one method and apparatus in accordance with the invention.

The information is transmitted from the MME to the eNBs within a "UMTS configuration data" information element part of a new information message. In another method, the information is included in an existing LTE message such as the "MME Configuration Update message". The MME sends an MME Configuration update message containing the list of RACs and, for each RAC the list of relevant RNC-ids. FIG. 3 illustrates an embodiment using the existing MME Configuration Update message. Previously, this message was only used to update information provided earlier in the S1 Setup procedure. Thus in this method, the purpose of the MME Configuration message is expanded. In another embodiment, the information is carried by a newly introduced message that would carry configuration data which are not updates of the S1 Setup configuration data.

In another method in accordance with the invention, "UMTS configuration data" information is sent by the MME to only a limited set of eNBs. These may be selected as belonging to a particular set of LTE tracking areas (TAs) which neighbour the UMTS RACs.

When a UE 1 connected to eNB 2 in the LTE network 3 is under consideration for handover to a neighbouring cell of a UMTS network 4, it informs the eNB 2 of the existence of the neighboring cell. As the relevant eNBs now hold the UMTS configuration information received from the MME, the source eNB 2 is able to apply the mask of the RNC-ids that comprise the RAC of that cell to the reported neighbour global UTRAN cell-id, permitting it to determine the correct neighbour RNC-id. It is assumed that only one mask can match for a given RAC. In masking, the RNC-id is compared with the first bits of the UC-id reported by the UE 1 to the source eNB 2. Thus, for example, if the UE reports (RAC=3 and UC-id=1111111111111111000000000001) and the UMTS configuration information provides, for RAC=3, RNC-id=16 bits long, or for RAC=3 and list of RNC-ids are 1111111111111111 or 1010101010101010, then it can be determined that the correct RNC-id is 1111111111111111. This correct neighbour RNC-id can be further included in a handover message towards the detected neighbouring UMTS cell.

Alternatively, for a UMTS network where it can be assumed that an RAC is composed of RNC-ids that all have the same length, the information provided to the LTE eNBs requires only a list of RACs and, for each RAC, the length of mask to be applied.

Using a method in accordance with the invention, may facilitate a self-optimizing network (SON) approach to ANRF for inter-RAT applications. Once a new UMTS neighbour cell has been detected, accessing the required configuration information may be automated, facilitating handovers towards that cell. The method may also be implemented independently of any future RA (re-)allocation in the UMTS system as the eNBs may be automatically updated The present invention may be embodied in other specific forms and carried out by other methods without departing from its spirit or essential characteristics. The described embodiments and methods are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for transferring information between wireless networks of different technology types, where a first network of a first technology type and a second network of a second different technology type have neighboring cells, the method comprising:
    a node in the first network receiving configuration information associated with a plurality of nodes of the second network, the information including identifying information for radio access controllers associated with neighboring cells of the second technology type; and,
    after the node has received the configuration information, the node in the first network sending the identifying information to a plurality of access nodes in the first network via which mobile devices access the first network.

2. The method of claim 1, wherein the node in the first network is a mobile management node.

3. The method of claim 1, wherein the first network is in accordance with 3GPP LTE standards and the second network is in accordance with UMTS standards, and wherein the node in the first network is a mobile management entity (MME), the radio access controllers of the second network are Radio Network Control (RNC) nodes and the identifying information includes RNC-ids.

4. The method of claim 3, wherein the identifying information is sent by the MME in a message that also fulfills another purpose.

5. The method of claim 4, wherein the message is the MME Configuration message.

6. The method of claim 3 and wherein the identifying information is sent by the MME in a message that is dedicated to this purpose only.

7. The method of claim 3, wherein the identifying information is sent from the MME to a plurality of eNBs via S1 interfaces.

8. The method as claimed in claim 3, wherein the configuration information received by the MME is obtained from an SGSN for a given RAC.

9. The method of claim 1, wherein the configuration information is received by the node in the first network at at least one of the following: at pre-determined intervals; when a network is newly set up; when handover is contemplated; and when the second network has been re-configured or otherwise changed.

10. The method of claim 1 wherein the configuration information includes a list of Routing Area Codes (RACs).

* * * * *

UNITED STATES PATENT AND TRADEMARK OFFICE
CERTIFICATE OF CORRECTION

PATENT NO.        : 8,615,231 B2
APPLICATION NO. : 13/001839
DATED             : December 24, 2013
INVENTOR(S)       : Demarez et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 387 days.

Signed and Sealed this
Twenty-second Day of September, 2015

Michelle K. Lee
*Director of the United States Patent and Trademark Office*